United States Patent
Nathan et al.

(10) Patent No.: US 8,966,468 B2
(45) Date of Patent: *Feb. 24, 2015

(54) SYSTEM FOR REMOTE LOADING OF OBJECTS OR FILES IN ORDER TO UPDATE SOFTWARE

(71) Applicant: TouchTunes Music Corporation, New York, NY (US)

(72) Inventors: Guy Nathan, Yerres (FR); Dominique Dion, Laval (CA)

(73) Assignee: TouchTunes Music Corporation, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/947,490

(22) Filed: Jul. 22, 2013

(65) Prior Publication Data

US 2013/0305235 A1    Nov. 14, 2013

Related U.S. Application Data

(63) Continuation of application No. 13/223,472, filed on Sep. 1, 2011, now Pat. No. 8,522,230, which is a continuation of application No. 11/730,449, filed on Apr. 2, 2007, now Pat. No. 8,032,879, which is a continuation of application No. 09/689,726, filed on Oct. 13, 2000, now Pat. No. 7,210,141, which is a continuation of application No. 09/144,440, filed on Sep. 1, 1998, now Pat. No. 6,240,550.

(51) Int. Cl.
    *G06F 9/44*        (2006.01)

(52) U.S. Cl.
    USPC ............................ 717/169; 717/172; 717/174

(58) Field of Classification Search
    USPC .................................. 717/169–176; 709/203
    IPC ............................. G06F 8/60,8/51, 8/65, 8/70
    See application file for complete search history.

(56) References Cited

U.S. PATENT DOCUMENTS

| | | | |
|---|---|---|---|
| 3,982,620 A | 9/1976 | Kortenhaus | |
| 4,186,438 A | 1/1980 | Benson et al. | |
| 4,232,295 A | 11/1980 | McConnell | |
| 4,335,809 A | 6/1982 | Wain | |

(Continued)

FOREIGN PATENT DOCUMENTS

| | | |
|---|---|---|
| AU | 199954012 | 4/2000 |
| DE | 3723737 A1 | 1/1988 |

(Continued)

OTHER PUBLICATIONS

Chan et al.,"Distributed Servers Architecture for Networked Video Services", IEEE, vol. 9, No. 2, pp. 125-136, 2001.*

(Continued)

*Primary Examiner* — Anil Khatri
(74) *Attorney, Agent, or Firm* — Nixon & Vanderhye PC

(57) ABSTRACT

A system for remote loading of objects or files in order to update software includes operating system architecture that calls for different tasks to be broken down into software modules that are connected to one another by dynamic links or are composed of executable subroutines that have main dependence links to other parts of the operating system. Each of the modules is composed of object files or libraries that are represented by dynamic link libraries among themselves according to a number of dependence levels that are described in their respective attributes.

20 Claims, 2 Drawing Sheets

(56) References Cited

U.S. PATENT DOCUMENTS

| | | |
|---|---|---|
| 4,335,908 A | 6/1982 | Burge |
| 4,412,292 A | 10/1983 | Sedam et al. |
| 4,521,014 A | 6/1985 | Sitrick |
| 4,528,643 A | 7/1985 | Freeny, Jr. |
| 4,558,413 A | 12/1985 | Schmidt et al. |
| 4,572,509 A | 2/1986 | Sitrick |
| 4,582,324 A | 4/1986 | Koza et al. |
| 4,593,904 A | 6/1986 | Graves |
| 4,597,058 A | 6/1986 | Izumi et al. |
| 4,636,951 A | 1/1987 | Harlick |
| 4,652,998 A | 3/1987 | Koza et al. |
| 4,654,799 A | 3/1987 | Ogaki et al. |
| 4,658,093 A | 4/1987 | Hellman |
| 4,667,802 A | 5/1987 | Verduin et al. |
| 4,675,538 A | 6/1987 | Epstein |
| 4,677,311 A | 6/1987 | Morita |
| 4,677,565 A | 6/1987 | Ogaki |
| 4,703,465 A | 10/1987 | Parker |
| 4,704,804 A | 11/1987 | Wyatt |
| 4,722,053 A | 1/1988 | Dubno |
| 4,761,684 A | 8/1988 | Clark et al. |
| 4,766,581 A | 8/1988 | Korn et al. |
| 4,787,050 A | 11/1988 | Suzuki |
| 4,792,849 A | 12/1988 | McCalley |
| 4,811,325 A | 3/1989 | Sharples, Jr. et al. |
| 4,825,054 A | 4/1989 | Rust |
| 4,829,570 A | 5/1989 | Schotz |
| 4,868,832 A | 9/1989 | Marrington |
| 4,920,432 A | 4/1990 | Eggers |
| 4,922,420 A | 5/1990 | Nakagawa et al. |
| 4,924,378 A | 5/1990 | Hershey |
| 4,926,485 A | 5/1990 | Yamashita |
| 4,937,807 A | 6/1990 | Weitz et al. |
| 4,949,187 A | 8/1990 | Cohen |
| 4,956,768 A | 9/1990 | Sidi et al. |
| 4,958,835 A | 9/1990 | Tashiro et al. |
| 4,999,806 A | 3/1991 | Chernow |
| 5,012,121 A | 4/1991 | Hammond |
| 5,041,921 A | 8/1991 | Scheffler |
| 5,058,089 A | 10/1991 | Yoshimaru et al. |
| 5,138,712 A | 8/1992 | Corbin |
| 5,155,847 A | 10/1992 | Kirouac |
| 5,163,131 A | 11/1992 | Row |
| 5,166,886 A | 11/1992 | Molnar |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,237,157 A | 8/1993 | Kaplan |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,262,875 A | 11/1993 | Mincer et al. |
| 5,276,866 A | 1/1994 | Paolini |
| 5,315,161 A | 5/1994 | Robinson |
| 5,339,413 A | 8/1994 | Koval |
| 5,341,350 A | 8/1994 | Frank et al. |
| 5,355,302 A | 10/1994 | Martin et al. |
| 5,357,276 A | 10/1994 | Banker |
| 5,369,778 A | 11/1994 | SanSoucie |
| 5,375,206 A | 12/1994 | Hunter |
| 5,418,713 A | 5/1995 | Allen |
| 5,420,923 A | 5/1995 | Beyers |
| 5,428,252 A | 6/1995 | Walker |
| 5,431,492 A | 7/1995 | Rothschild |
| 5,445,295 A | 8/1995 | Brown |
| 5,455,926 A | 10/1995 | Keele |
| 5,457,305 A | 10/1995 | Akel |
| 5,465,213 A | 11/1995 | Ross |
| 5,475,835 A | 12/1995 | Hickey |
| 5,481,509 A | 1/1996 | Knowles |
| 5,495,610 A | 2/1996 | Shing |
| 5,496,178 A | 3/1996 | Back |
| 5,499,921 A | 3/1996 | Sone |
| 5,511,000 A | 4/1996 | Kaloi |
| 5,513,117 A | 4/1996 | Small |
| 5,548,729 A | 8/1996 | Akiyoshi |
| 5,550,577 A | 8/1996 | Verbiest |
| 5,555,244 A | 9/1996 | Gupta |
| 5,557,515 A | 9/1996 | Abbruzzese et al. |
| 5,557,541 A | 9/1996 | Schulhof |
| 5,559,505 A | 9/1996 | McNair |
| 5,559,549 A | 9/1996 | Hendricks |
| 5,561,709 A | 10/1996 | Remillard |
| 5,566,237 A | 10/1996 | Dobbs |
| 5,570,363 A | 10/1996 | Holm |
| 5,583,994 A | 12/1996 | Rangan |
| 5,592,551 A | 1/1997 | Lett |
| 5,594,509 A | 1/1997 | Florin |
| 5,612,581 A | 3/1997 | Kageyama |
| 5,613,909 A | 3/1997 | Stelovsky |
| 5,619,247 A | 4/1997 | Russo |
| 5,619,698 A | 4/1997 | Lillich et al. |
| 5,623,666 A | 4/1997 | Pike |
| 5,642,337 A | 6/1997 | Oskay |
| 5,644,714 A | 7/1997 | Kikinis |
| 5,644,766 A | 7/1997 | Coy |
| 5,668,592 A | 9/1997 | Spaulding |
| 5,668,788 A | 9/1997 | Allison |
| 5,684,716 A | 11/1997 | Freeman |
| 5,691,778 A | 11/1997 | Song |
| 5,697,844 A | 12/1997 | Von Kohorn |
| 5,703,795 A | 12/1997 | Mankowitz |
| 5,708,811 A | 1/1998 | Arendt et al. |
| 5,712,976 A | 1/1998 | Falcon |
| 5,726,909 A | 3/1998 | Krikorian |
| 5,734,719 A | 3/1998 | Tsevdos |
| 5,734,961 A | 3/1998 | Castille |
| 5,758,340 A | 5/1998 | Nail |
| 5,761,655 A | 6/1998 | Hoffman |
| 5,762,552 A | 6/1998 | Vuong |
| 5,774,668 A | 6/1998 | Choquier et al. |
| 5,774,672 A | 6/1998 | Funahashi |
| 5,778,395 A | 7/1998 | Whiting et al. |
| 5,781,889 A | 7/1998 | Martin et al. |
| 5,790,172 A | 8/1998 | Imanaka |
| 5,790,671 A | 8/1998 | Cooper |
| 5,790,856 A | 8/1998 | Lillich |
| 5,793,980 A | 8/1998 | Glaser |
| 5,798,785 A | 8/1998 | Hendricks |
| 5,802,599 A | 9/1998 | Cabrera |
| 5,808,224 A | 9/1998 | Kato |
| 5,809,246 A | 9/1998 | Goldman |
| 5,832,287 A | 11/1998 | Atalla |
| 5,835,843 A | 11/1998 | Haddad |
| 5,845,104 A | 12/1998 | Rao |
| 5,848,398 A | 12/1998 | Martin |
| 5,854,887 A | 12/1998 | Kindell |
| 5,862,324 A | 1/1999 | Collins |
| 5,864,870 A | 1/1999 | Guck |
| 5,867,714 A | 2/1999 | Todd et al. |
| 5,884,028 A | 3/1999 | Kindell |
| 5,884,298 A | 3/1999 | Smith |
| 5,887,193 A | 3/1999 | Takahashi |
| 5,913,040 A | 6/1999 | Rakavy et al. |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,923,885 A | 7/1999 | Johnson et al. |
| 5,930,765 A | 7/1999 | Martin |
| 5,931,908 A | 8/1999 | Gerba |
| 5,949,688 A | 9/1999 | Montoya |
| 5,959,869 A | 9/1999 | Miller et al. |
| 5,959,945 A | 9/1999 | Kleiman |
| 5,966,495 A | 10/1999 | Takahashi |
| 5,978,855 A | 11/1999 | Metz |
| 6,002,720 A | 12/1999 | Yurt |
| 6,009,274 A | 12/1999 | Fletcher et al. |
| 6,018,337 A | 1/2000 | Peters |
| 6,018,726 A | 1/2000 | Tsumura |

(56) References Cited

U.S. PATENT DOCUMENTS

| | | | |
|---|---|---|---|
| 6,072,982 A | 6/2000 | Haddad | |
| 6,151,634 A | 11/2000 | Glaser | |
| 6,240,550 B1 | 5/2001 | Nathan et al. | |
| 6,256,773 B1 | 7/2001 | Bowman-Amuah | |
| 6,425,125 B1 | 7/2002 | Fries et al. | |
| 6,442,549 B1 * | 8/2002 | Schneider | 1/1 |
| 6,470,496 B1 | 10/2002 | Kato et al. | |
| 6,658,090 B1 | 12/2003 | Harjunen et al. | |
| 6,728,956 B2 | 4/2004 | Ono | |
| 6,751,794 B1 | 6/2004 | McCaleb et al. | |
| 6,789,215 B1 | 9/2004 | Rupp et al. | |
| 6,904,592 B1 | 6/2005 | Johnson | |
| 7,210,141 B1 | 4/2007 | Nathan et al. | |
| 7,415,707 B2 * | 8/2008 | Taguchi et al. | 717/174 |
| 7,430,736 B2 * | 9/2008 | Nguyen et al. | 717/176 |
| 7,464,112 B2 * | 12/2008 | Plastina et al. | 1/1 |
| 7,783,593 B2 * | 8/2010 | Espino | 707/609 |
| 8,032,879 B2 | 10/2011 | Nathan et al. | |
| 8,151,259 B2 * | 4/2012 | Fadell | 717/173 |
| 8,239,142 B2 * | 8/2012 | Collette et al. | 702/20 |
| 8,495,109 B2 * | 7/2013 | Nathan et al. | 707/822 |
| 8,589,474 B2 * | 11/2013 | Parsons et al. | 709/203 |
| 8,661,406 B2 * | 2/2014 | Shapiro | 717/106 |
| 8,713,557 B2 * | 4/2014 | Keys et al. | 717/171 |
| 8,739,153 B2 * | 5/2014 | Keys et al. | 717/171 |
| 8,843,586 B2 * | 9/2014 | Pantos et al. | 709/217 |
| 2011/0321026 A1 | 12/2011 | Nathan et al. | |

FOREIGN PATENT DOCUMENTS

| | | |
|---|---|---|
| DE | 3820835 A1 | 1/1989 |
| DE | A 3820835 | 1/1989 |
| DE | 4 244 198 | 6/1994 |
| DE | 19610739 | 9/1997 |
| EP | A0082077 | 6/1983 |
| EP | 0140593 A2 | 5/1985 |
| EP | 0256921 | 2/1988 |
| EP | 0283304 | 9/1988 |
| EP | A 0283350 | 9/1988 |
| EP | 0 309 298 | 3/1989 |
| EP | A 0313359 | 4/1989 |
| EP | 0340787 | 11/1989 |
| EP | 0363186 | 4/1990 |
| EP | 0 425 168 A | 5/1991 |
| EP | 0464562 A2 | 1/1992 |
| EP | 0480558 | 4/1992 |
| EP | 0 498 130 | 8/1992 |
| EP | 0498130 A2 | 8/1992 |
| EP | 0 507 110 | 10/1992 |
| EP | 0538319 B1 | 4/1993 |
| EP | A 0631283 | 12/1994 |
| EP | 0 632 371 | 1/1995 |
| EP | 0786122 B1 | 7/1997 |
| EP | 0817103 | 1/1998 |
| EP | 0841616 A2 | 5/1998 |
| EP | 0919964 | 6/1999 |
| EP | 0959570 A1 | 11/1999 |
| EP | 0 974 896 A1 | 1/2000 |
| EP | 0982695 | 3/2000 |
| FR | A 2602352 | 2/1988 |
| GB | A 2122799 | 1/1984 |
| GB | 2166328 A | 4/1986 |
| GB | 2170943 | 8/1986 |
| GB | 2193420 | 2/1988 |
| GB | 2 238 680 A | 6/1991 |
| GB | 2259398 | 3/1993 |
| GB | 2262170 A | 6/1993 |
| JP | 57-173207 | 10/1982 |
| JP | 58-179892 | 10/1983 |
| JP | 60-253082 | 12/1985 |
| JP | 62-192849 | 8/1987 |
| JP | 62-284496 | 12/1987 |
| JP | 63-60634 | 3/1988 |
| JP | 2-153665 | 6/1990 |
| JP | 5-74078 | 10/1993 |
| JP | 07281682 | 10/1995 |
| JP | 08-279235 | 10/1996 |
| JP | 10-098344 | 4/1998 |
| WO | WO 86 01326 A | 2/1986 |
| WO | WO A 90 07843 | 7/1990 |
| WO | WO 91/08542 | 6/1991 |
| WO | WO A 91 20082 | 12/1991 |
| WO | WO 93/16557 | 8/1993 |
| WO | WO A 93 18465 | 9/1993 |
| WO | WO A 94 03894 | 2/1994 |
| WO | WO 94/14273 | 6/1994 |
| WO | WO 94/15306 | 7/1994 |
| WO | WO 94 15416 A | 7/1994 |
| WO | WO 95 03609 A | 2/1995 |
| WO | WO 95/29537 | 11/1995 |
| WO | WO 96/12255 | 4/1996 |
| WO | WO 96/12256 | 4/1996 |
| WO | WO 96/12257 | 4/1996 |
| WO | WO 96 12258 A | 4/1996 |
| WO | WO 98/45835 | 10/1998 |
| WO | WO 01/00290 | 1/2001 |

OTHER PUBLICATIONS

Bonakdarpour et al, "Automated Distributed Implementation of Component-based Models with Priorities", ACM, pp. 59-68, 2011.*

Rollins et al, "Pixie: A Jukebox Architecture to Support Efficient Peer Content Exchange", ACM, pp. 179-188, 2002.*

Slingerland et al, "Cache Performance for Multimedia Applications", ACM, pp. 1-14, 2001.*

Bonczek, Robert H. et al, "The DSS Development System", 1983 National Computer Conference, Anaheim, California, May 16-19, 1983, pp. 441-455.

IBM Technical Disclosure Bulletin, vol. 30, No. 5, Oct. 1987, "Method for Automated Assembly of Software Versions", pp. 353-355.

"Robotic Wafer Handling System for Class 10 Environments" IBM Technical Disclosure Bulletin, vol. 32, No. 9A, Feb. 1990, pp. 141-143.

Bonczck, Robert H. et al, "The DSS Development System", 1983 National Computer Conference, Anaheim, California, May 16-19, 1983, pp. 441-455.

"High-speed Opens and Shorts Substrate Tester", IBM Technical Disclosure Bulletin, vol. 33, No. 12, May 1991, pp. 251-259.

"Darts Revolution Again", Replay Magazine, Mar. 1991, pp. 146-148.

Galen A. Grimes, "Chapter 18, Taking Advantage or Web-based Audio."

Petri Koskelainem "Report on Streamworks™ ".

W. Richard Stevens, "TCP/IP Illustrated: vol. 1, the Protocols".

Nowell Outlaw "Virtual Servers Offer Performance benefits for Networks Imaging".

IBM Technical Disclosure Bulletin, vol. 41, No. 1, Jan. 1998, "Safe Mechanism for Installing Operating Systems Updates with Applications," pp. 557-559.

* cited by examiner

SYSTEM FOR REMOTE LOADING OF OBJECTS OR FILES IN ORDER TO UPDATE SOFTWARE

CROSS-REFERENCES TO RELATED APPLICATIONS

This application is a continuation of application Ser. No. 13/223,472 filed Sep. 1, 2011, now allowed, which is a continuation of application Ser. No. 11/730,449 filed Apr. 2, 2007, now U.S. Pat. No. 8,032,879, which is a continuation of application Ser. No. 09/689,726 filed Oct. 13, 2000, now U.S. Pat. No. 7,210,141, which is a continuation of application Ser. No. 09/144,440 filed Sep. 1, 1998, now U.S. Pat. No. 6,240,550, which claims priority to French Application No. 98 09296 filed Jul. 21, 1998, the entire contents of each of which are hereby incorporated by reference in this application.

BACKGROUND OF THE INVENTION

This invention pertains to a system for remote loading of objects or files in order to update software, particularly for audiovisual reproduction systems that are triggered by the payment of fees, such as jukeboxes or other devices.

In the prior art, devices for remote loading of an operating system through a network are known such as, for example, from British Patent No. 2 231 180. The teaching of this patent application calls for loading a first computer, which is connected to a second computer via a network, by loading a subset of the operating system into the memory of the first computer, whereby the subset contains the commands that make it possible to copy files, create a directory, and format a disk, as well as allowing a connection to operate through the network so that this subset can then be used to transfer all of the operating system files from the second computer to the disk of the first computer.

In this type of remote loading, the purpose is to load the entire operating system and all of the operating system files. This thus limits remote loading either to tying up, for relatively long periods of time, telecommunications systems that are to carry out remote loading in the case of the operating system, or causes the relevant files to have to be updated frequently.

From U.S. Pat. No. 4,958,278 a system is also known for remote loading to a terminal that is not equipped with a disk player.

From French Patent No. 2 682 786 another process is known for remote loading to a terminal that is not equipped with a hard disk.

Finally, European Patent No. 0 358 992 teaches a method for remote loading, via a network, of an operating system or of executable files to a computer that does not include a boot device or other devices that hold the executable program. A first minimum boot program is transferred initially, and then this minimum boot program executes itself, establishes a logical link to a disk of the server, and allows the querying computer to treat the server disk as a local boot device.

SUMMARY OF THE INVENTION

The object of the invention is to avoid the necessity, on the one hand, of rebooting the terminal to which downloading is done and, on the other, to make it possible to transfer operating files or parts of an executable program without having to reinitialize the machine, and doing so while making sure that the operation of the system is not degraded by the remotely loaded version.

This object is achieved by virtue of the fact that the architecture of the operating system provides for breaking the different tasks down into software modules that are interconnected by means of dynamic links or are composed of executable subroutines that have main dependence links to other parts of the operating system, whereby each of the modules is composed of object files or libraries that are represented by dynamic link libraries, which are organized among themselves according to a number of dependence levels, as described in their respective attributes.

According to another feature, the attributes of an object or a library indicate the version number and the dependencies of the object with respect to other objects.

According to another feature, the attributes indicate the levels attributed to the modules.

According to another feature, the different tasks include a main task that includes a module (JUKECORE), which is designed to load the dynamic link libraries (DLLs), to initialize the nucleus of the program, to initialize the graphics management module (GFX), to initialize the library loading module (WDLL), to load the Telecom module of the telecommunications tasks (TELECOM.DLL), and to launch the screen interpreter program as a main task.

According to another feature, the program is subdivided into a certain number of modules that define a task that is specific to the terminal.

According to another feature, this specific task is that which corresponds to a jukebox and includes a specific main task, a certain number of modules that define the Windows™ functions of the display, which are the following:
a module for running the mouse signals or the touch screen;
a module for running the messages that are exchanged among the objects;
a "FIL.DJL" module for managing the files on disk;
a "FIL.DJL" module for reading and writing files to and from disk;
a "FILIO.DJL" module for monitoring all of the events that are generated by the hardware, such as the touch screen, the sound card, and the money hardware processing interface.

According to another feature, the main task of the jukebox application includes a "SILOAD.DLL" module, which contains the library of the loader program, whereby the library is intended to verify the versions of the dynamic link libraries that are requested, to load them, and to call the Telecom task modules in order to transfer files.

According to another feature, the SILOAD module includes the list in a file (DLL.DEFAULT) of the minimum versions that are required for operation, as well as the list of all of the functions that are represented either by the libraries (DJL) (DATA JUKEBOX LIBRARY) or by the object files (DJO DATA JUKEBOX OBJECT).

According to another feature, the object or library contains the list of all of the functions that the library or object needs, as well as the version numbers and dependencies.

According to another feature, WDLL ensures the management of all of the new modules and verifies that the remotely loaded modules do not have any missing dependencies and that they have been loaded with the necessary versions.

According to another feature, SILOAD manages the loading of the modules that are specific to the task of the terminal, i.e., all of the "DJL" modules already listed above, as well as the jukebox library modules constituted by WOBJECT manage the object, the mixer, and the purchases; the "WCURSOR" module manages the movements of the cursor; the DBMAPI module manages the database; the "WFONTS" module manages all of the font types; and the "PARSER" module analyzes and generates the screens from the script and verifies the grammar with the aid of the "GRAMMAR.DJL" module and the lexical module "LEXY.DJL."

According to another feature, the library loading module SILOAD includes a "WINDEF" module that contains the list of the files that have to be included in order to manage the windows of a Windows™ display that is supplied on the monitor of the jukebox-type terminal.

According to another feature, this list of objects consists of:
an "OBJET WPSCREEN.DJO" module, which makes it possible to define the main page on the monitor;
a "WSCREEN.DJO" object module, which makes it possible to determine in this main page the number of screens that are available and thus to allow multiple windows or screens to be displayed;
a "WIMAGE.DJO" module, which makes it possible to determine and define on the screen the image that it will use;
a "WANIM.DJO" module, which makes it possible to define the animation when the image is animated;
a "WBUTTON.DJO" module, which makes it possible to define and manage the buttons that are used on the screen of the main page;
a "WLABEL.DJO" module, which makes it possible to create the labels that make it possible to write on top of an object; and
a "WSCROLLER.DJO" module, which makes it possible to design the scroll display zones, between two points for example, horizontal, diagonal, vertical.

According to another feature, all of these object modules, which are managed by the main task, use a "JHANDLER" library, which makes it possible to define the fixed uses of the screens and thus to determine which are the interfaces that ensure the link to the different objects that are defined by the preceding modules.

According to another feature, the SILOAD task launches or loads the "XCP" module, makes it possible to manage payment tasks such as those handled by ticket receiving systems or coin or card payment units, and also makes it possible to save the basic information in the IBUTTON.

BRIEF DESCRIPTION OF THE DRAWINGS

Other features and advantages of this invention will be made clearer by reading the description given below, with reference to the attached drawings, where.

DETAILED DESCRIPTION OF PREFERRED EMBODIMENTS

Preferably, but without being limited hereto, the audiovisual reproduction system uses the hardware elements listed and referenced below.

Figure 1:
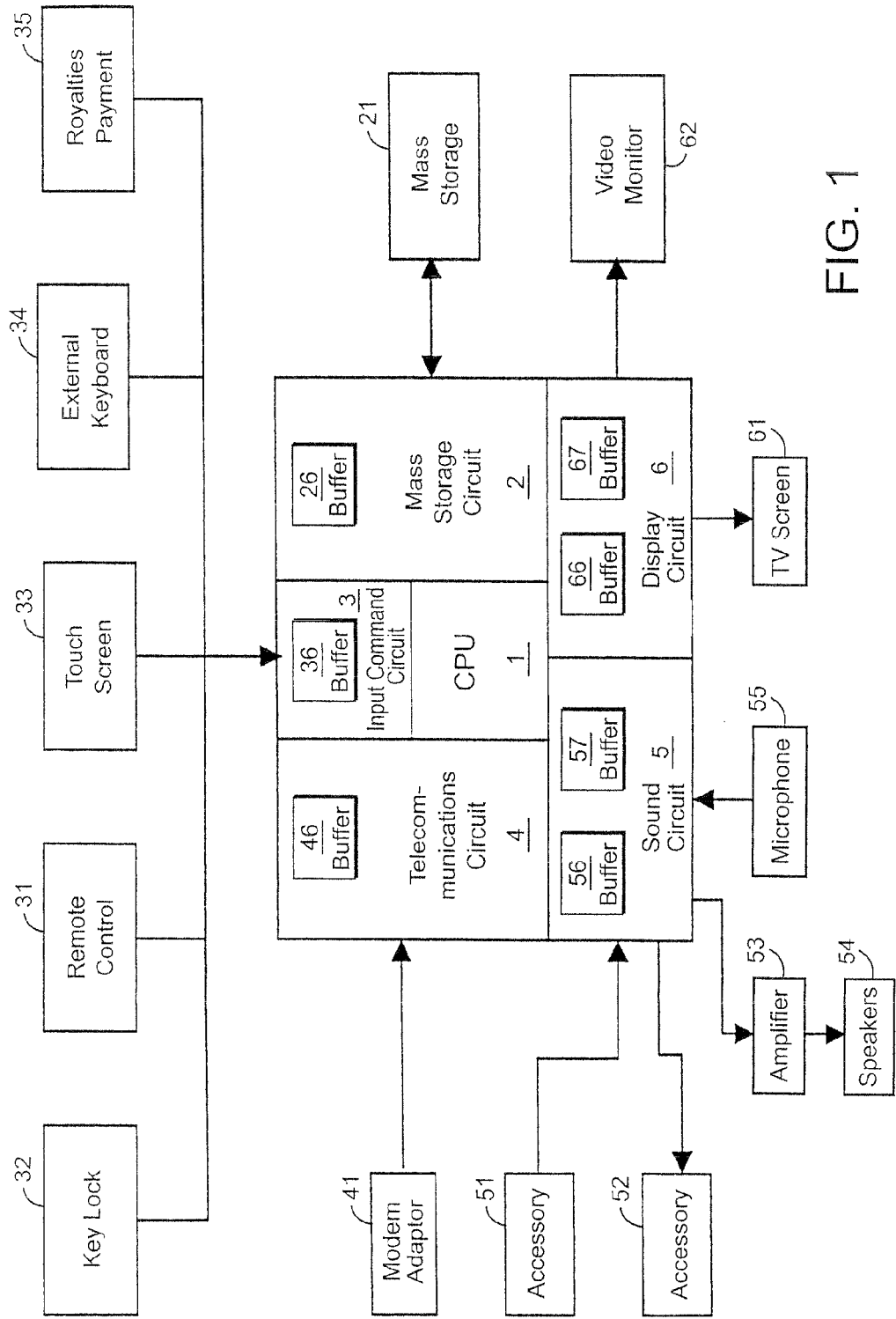
FIG. 1 shows a schematic of the electrical diagrams of the hardware that constitutes the invention.

Referring to FIG. 1, a microprocessor central unit 1 is a high-performance PC compatible system, whereby during implementation a Pentium-type system was chosen that has the following memory resources and specifications:
compatibility with the local VESA bus;
processor cache: 256 KB minimum;
RAM memory: 32 MB;
high-performance serial ports;
SVGA microprocessor graphics adapter;
SCSI/2 type bus controller;
self-powered static RAM memory.

Any other central processing unit that has the equivalent or better performance can be used in the invention.

This central processing unit controls and manages a sound control circuit (5), a telecommunications control circuit (4), an input control circuit (3), a bulk storage control circuit (2), and a display control circuit (6). The display consists primarily of a flat-screen non-interlaced SVGA high-resolution and low-radiation video monitor (62), i.e., this is the monitor that is used to reproduce images (for example, the album covers of musical selections), graphics, or video clips.

A bulk storage (21), which uses hard disks of the high-speed and high-capacity SCSI type, is associated with the storage that is already present in the microprocessor device. This storage serves to store digitized and compressed audio-visual information.

A high-speed telecommunications modem adapter (41), which is built in order to enable the link to an audiovisual information distribution network that is controlled by a central server.

In order to reproduce the sound information of the musical selections, the system includes loudspeakers (54) that receive the signal from a tuner-amplifier (53), which is connected to electronic circuit (5) that incorporates two memory buffers (56, 57) of the music synthesizer type that are supplied to support a large number of input sources while providing CD (compact disc) type output quality.

Likewise, the display control circuit 6 also has two buffer memories (66, 67) for the purpose explained above.

A 240-watt thermally regulated and ventilated power supply feeds power to the system. This power supply is protected against overcurrents and overdriving.

By means of its input controller circuit (3), the audiovisual reproduction system manages a touch screen (33), which includes a glass coating panel that uses the "advanced surface-wave technology", as well as an AT-type bus controller. This touch screen is able to display on video monitor (62) or the screen of a television set (61) various selection data that are used by the customers, as well as management command and control data that are used by the manager or owner of the system. This touch screen is also used for maintenance purposes in combination with an external keyboard (34) that can be connected to the system which, for this purpose, has a keyboard connector that is controlled by a key lock (32) via interface circuit (3).

Input circuit (3) also interfaces the system with a remote control assembly (31) that consists of, for example, a radio frequency RF remote control.

A fee payment device (35) is also connected to input interface circuit (3). It is also possible to use any other device that makes it possible to receive any kind of payment using coins, tickets, tokens, magnetic or microchip cards, or any combination of these means of payment.

To allow the system to be installed, it is equipped with a chassis or is built with customizable external fittings.

In addition to these elements, a wireless microphone (55) is connected to sound controller (5); this makes it possible to convert the sound controller into a powerful public-address and information system or optionally into a karaoke machine. Likewise, the system can also use a wireless loudspeaker system.

Remote control assembly (31) allows the manager from, e.g., behind the bar, to access and control various commands such as:
the microphone on-off control;
the loudspeaker muting control;
the control for canceling the musical selection that is currently being played.

Two buffers (56, 57) are associated with sound controller circuit (5) in order to make it possible to store, each alternately, a data item corresponding to at least approximately a quarter of a second of sound. Likewise, two buffers (66, 67) are associated-with video controller circuit (6), whereby each buffer is able, either by itself or alternatively, to store at least approximately one-tenth of a second of an image. Finally, a respective buffer (46, 36, 26) is associated with each of communications controller circuit (4), input interface circuit (3), and storage circuit (2).

The system operating software was developed around a library of tools and services that were very largely oriented toward the audiovisual domain in a multimedia universe. This library advantageously includes a high-performance multi-task operating system that effectively allows the simultaneous execution of multiple fragments of code. This operating software also allows the concurrent execution, in an orderly and completely conflict-free way, of operations that are carried out on the display and the sound reproduction structure, as well as the managing of the telecommunications links through the distribution network. Moreover, this software is highly flexible.

The operating system is divided into modules, which include a first boot module (7), which in turn is subdivided into a first main program module (70) "JUK.EXE", which checks the memory and verifies whether the minimum number of objects is available to ensure the operation of the jukebox; a second module (71), which is dynamically linked and is dependent thereon, is represented by the "JUKECORE.DLL" module. The function of the second module (71) is to hold the libraries in C and to ensure the execution of the main task.

The architecture of the operating system calls for the different tasks to be broken down into software modules that are connected to one another by dynamic links or consist of executable subroutines that have main dependence links to other parts of the operating system. Each of the modules is composed of object files or dynamic link library files that are organized according to a number of dependence levels described in the attributes. The attributes of an object or a library indicate the version number and the dependencies of the object or library file with respect to other object files, as described below for the PARSER module. Each attribute indicates the level attribute to the module. Thus, the JUK.EXE module (70) is of a higher level than the modules JUKECORE (71), TLS (72), CRDE (73), GFX (74), WDLL (75), JEEP (9) and TELECOM (10), but TELECOM module (10) is dependent on JEEP module (9) (see link 910), and is thus lower in level than JEEP (9).

Likewise, JEEP (9) (see link 759) is of a lower level than WDLL module (75), because it is dependent on it and TLS (725), of a higher level than WDLL (75). However, TLS and GFX may be on the same level. The main task includes a module (JUKECORE) whose purpose is to initialize or load module (73), the nucleus of program "CRDE.DLL", to initialize or load module (74) for managing graphics (GFX), to initialize or load module (75) for loading libraries (WDLL.DLL), to load Telecom module (10) for the task of telecommunications (DLL), to load TLS.DLL module (72), which contains all the uses required for the jukebox, for telecommunications, time, decryption, etc., . . . , to initialize or load the library of JEEP (Juke Execution Exchange Protocol) programs, which handle the tasks of an integrity server, load request and dialogue with the server, and to launch program (80, SILOAD.DLL) as a main task. The main task of the jukebox application includes a module (SILOAD.DLL) that contains the library of the loader program whose purpose is to verify the dynamic link library versions required in (WDLL), to load them or to call the tasks using the Telecom module in order to transfer files. The WDLL.DLL module includes the list in a file (DLL.DEFAULT) of the versions that are required for operation, as well as the list of all of the functions that are represented by libraries (LIBRARY) (DLL, DJL) or by object files (DJO). Each object or library contains the list of all of the functions that the library or object needs, as well as the version members and dependencies. The WDLL module manages all of the new modules, checks to verify the interdependencies, and verifies that the remotely loaded modules have no dependence and have been loaded with the required versions. Application part (8) that is inherent in a jukebox includes a certain number of modules that are loaded and launched by SILOAD and that define the Windows™ functions of the display, which include the following:

a module (81) for running the mouse or touch-screen signals;

a module (82) for running the messages that are exchanged between the objects and the various other modules;

a FIL.DLL module (83) for managing the files on disk;

a read-write module (84) FILO.DJL for files on disk;

a JSTRUCT.DJL module (85) for monitoring all of the events produced by the hardware, such as the touch screen, the sound card, and the interface for processing fee hardware.

SILOAD manages the loading of the modules that are specific to the task of the terminal, i.e., all of the DJL modules already listed above, as well as jukebox library modules (87), consisting of WOBJECT (870), which manages the objects such as the mixer and purchases; WCURSOR module (871), which manages the movements of the cursor; DBMAPI module (872), which manages the database; WFONTS module (873), which manages all of the types of fonts; PARSER (syntactic analysis program) module (874), which analyzes and generates the screens from the script and verifies grammar with the aid of module "GRAMMAR.DJL" (876) and module "LEXY.DJL" (875), which is the lexical module that assigns the functions of the words within the language. PARSER module (874) contains in its file header the following information:

char*parser_version_info="DLL INFO.DJL,"
"DLL-NAME PARSER.DJL"
"VERSION 1;"
"CREATOR KENDALF;"
"REQUIRES lexyy.djl;4"
"REQUIRES grammar-djl;5";

All of the modules and all of the libraries (DJO, DLL, DJL) contain information similar to that of the PARSER module, and this information determines the needs in terms of versions and dependence.

Figure 2:
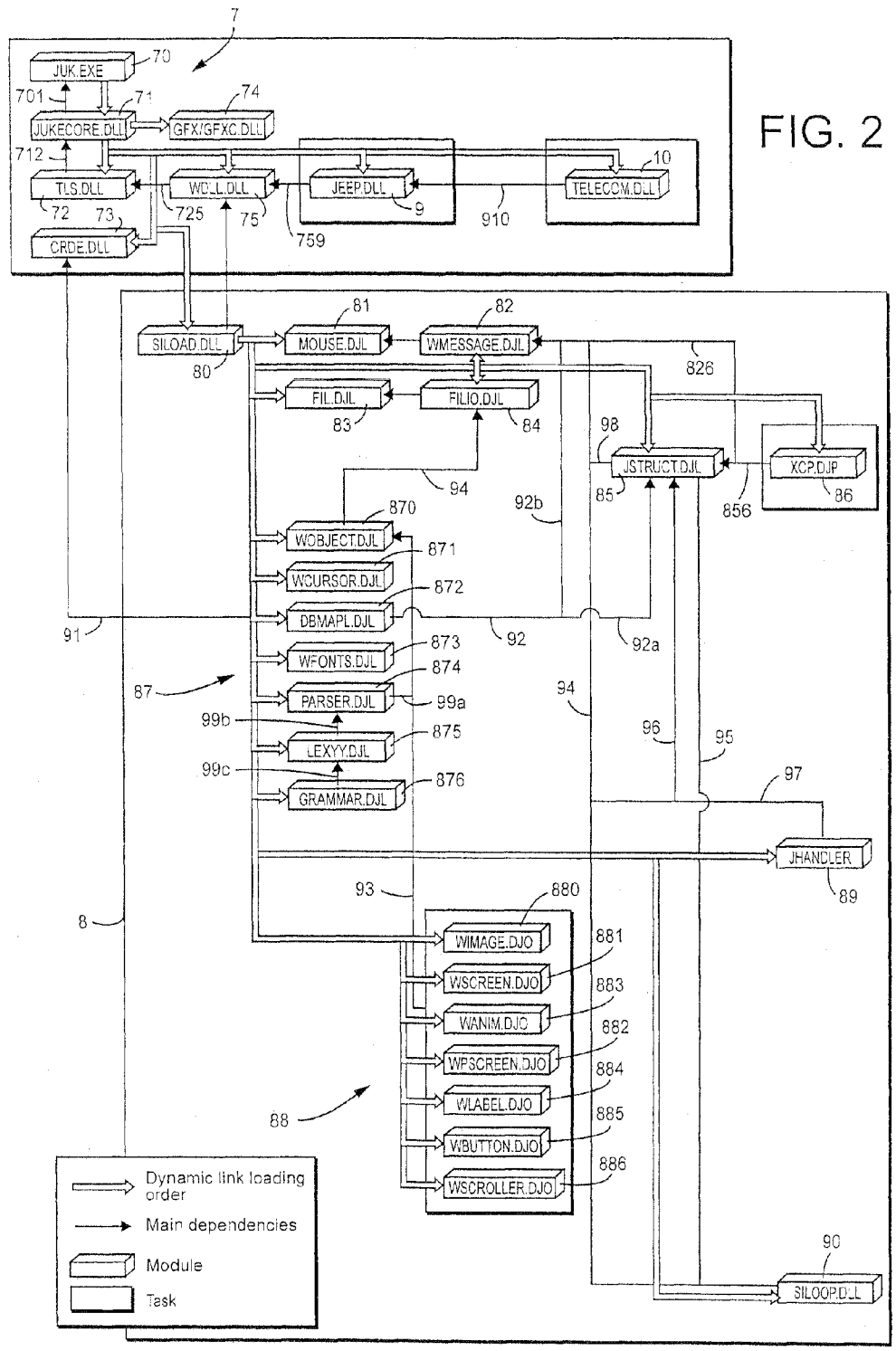
FIG. 2 shows a flow chart of the relationships between the library modules and the object modules.

Thus, the PARSER module needs LEXY module version 4 and GRAMMAR module version 5 in order to allow it to be executed by the system. The double arrows in FIG. 2, which connect the various modules to one another, indicate the order in which the different files are loaded. Thus, as indicated previously, it will be necessary to start by loading JUKE-.EXE, then loading JUKECORE.DLL, and being able, from JUKECORE.DLL, to load GFX.DLL, TLS.DLL, WDLL.DLL, JEEP.DLL, TELECOM.DLL, CRDE.DLL, and SILOAD.DLL.

The single arrows represent the dependencies between files. Thus, arrow (91) indicates that the DJL and, in particular, DBMAPI modules are dependent on CRDE.DLL. Arrow (93) indicates that the DJO files are dependent on the WOBJECT.DJL module. The WOBJECT.DJL module is itself dependent on the FILIO.BJL module. Arrow (92*a*) indicates that DBMAPI.DJL is dependent on JSTRUCT.DJL, and arrow (92b) indicates that DBMAPI.DJL is dependent on WMESSAGE.DJL. Arrow (98) indicates that JSTRUCT.DJL is dependent on the WMESSAGE.DJL file. WMESSAGE is dependent on the MOUSE.DJL file, since FILIO.DJL is dependent on the FIL.DJL file, the file XCP.DJL is dependent, as indicated by arrow (856), on JSTRUCT.DJL and, as indicated by arrow (826), on WMESSAGE.DJL. The JHANDLER file is dependent, as indicated by arrow (97), on WMESSAGE.DJL and, as shown by arrow (96), on JSTRUCT.DJL. The SILOOP.DJL file is dependent, as indicated by arrow (95), on JSTRUCT.DJL and, as indicated by arrow (94) on WMESSAGE.DJL. The TELECOM.DLL file is dependent, as indicated by arrow (910), on JEEP.DLL, which in turn is dependent, as shown by arrow (959), on WDLL.DLL. The WDLL.DLL file is dependent, as indicated by arrow (725), on TLS.DLL. Likewise, arrow (89c) shows that GRAMMAR.DJL is dependent on LEXY.DLL and, as indicated by arrow (99b), that LEXY.DJL is dependent on PARSER.DJL. Thus, as was seen previously, PARSER requires LEXY and GRAMMAR to execute itself, and version 1 of PARSER calls version 4 of LEXY.DJL and version 5 of GRAMMAR.DJL. Likewise, WOBJECT.DJL is dependent, as indicated by arrow (99a), on PARSER.DJL. Thus, all of the .DJO, .DLL, and .DJL modules and libraries contain information similar to that of the PARSER module, which determines the version requirements of the various modules on which a given module is dependent. This information also indicates the dependencies of the modules with respect to the other modules, as indicated by the arrows in FIG. 2.

Library loading module SILOAD also loads or launches a module SILOOP.DLL (90), with an event wait tape. A set of modules (88) contains a list of the files that have to be included there to manage the windows of a Windows™ that is provided on the monitor of the jukebox-type terminal.

This list of objects consist of:
an object file (883) "WPSCREEN.DJO", which makes it possible to define the main page on the monitor;
an object file (881) "WSCREEN", which makes it possible to determine on this main page the number of screens available and thus to make it possible to display multiple windows or screens;
an object file (880) "WIMAGE.DJO", which makes it possible to determine and define on the screen the image-that the screen will use;
an object file (882) "WANIM.DJO", which makes it possible to define the animation when the image is animated;
an object file (885) "WBUTTON.DJO", which makes it possible to define and manage the buttons that will be used on the screen of the main page, such as the actuation buttons used in the graphical interface that is defined in patent application PCT WO 96/12258;
an object file (884) "WLABEL.DJO", which makes it possible to create labels that make it possible to write on top of an object; and
an object file (886) "WSCROLLER.DJO", which makes it possible to define the vertical-scroll display zones.

A "JHANDLER" library makes it possible to define the fixed uses of the screens and thus to determine which are the interfaces that ensure the links to the different objects that are defined by the previous modules.

Library module "XCP" (86) makes it possible to manage the payment tasks such as those of ticket receiving systems or coin or card payment units and also makes it possible to back up basic information in the IBUTTON, which is an integrated circuit for storing secret codes for the user.

Thus, when a new file is sent by remote loading to the system, the file contains information on its level, which depends on the type of file. The files of the graphical images, for example WIMAGE.DJO, have the highest levels, and the hardware management-files, for example XCP.DJL, have the lowest levels. The JEEP module verifies the dependence logic by starting with the lowest-level files and moving up toward the higher files, all the while ensuring that the necessary dependencies between the files or libraries are respected. In this way, a modification in WOBJECT.DJL will cause JEEP to verify that the version information required by WOJBECT-.DJL for the DJO files that are dependent and are required for its execution corresponds to the minimum versions required by the information recorded in the WOBJECT.DJO file. Thus, if WOBJECT.DJL requires a certain version of WPSCREEN.DJO, it will verify that this version is at least present and that, if there is only a version of an inadequate level, it will report a problem. Then JEEP will go up the dependence links toward FILIO.DJL and FIL.DJL.

The hard disk of the jukebox is organized in such a way as to comprise a directory C:NEWJUKE, which contains the new jukebox files when new modules are remotely loaded. Another file, C:OLDJUKE, contains a backup of the stable versions of the files and modules that are required for the operation of the jukebox. The JEEP (JUKE EXECUTION EXCHANGE PROTOCOL) module contains an automatic file manager that keeps track of the modules and files that are updated by backing up the old files for a certain period of time and by moving their files into the NEWJUKE directory. This task also copies the files on the tracks of the disk in the event that there is a sudden incident during the remote loading operation. The JEEP module also contains a reboot manager that is responsible for changing the execution level of the files of the jukebox once the automatic file manager has determined that an update of the jukebox has been accomplished. The JEEP.DLL module also generates a MISDEPS.DAT file when a missing dependence has been detected. This file contains lines in the form NEEDPARSER.DLL arrow version 2: NEEDLEXY.DLL.fwdarw.version 2.0, etc. . . . . . This file allows the server, by reading this MISDEPS.DAT file, to determine the modules on the jukebox and to reload them.

Other modifications within the grasp of one skilled in the art are also part of the spirit of the invention.

What is claimed is:

1. A computer server configured to transfer system update files to a remotely located receiving jukebox device provided with an operating system wherein different tasks are broken down into a plurality of interconnected modules and further comprising libraries, the computer server comprising:
a network connection to the receiving jukebox device; and
processing resources, including at least one processor, configured to send a new file to said receiving jukebox device over the network connection; wherein
the new file, when received by the receiving jukebox device, includes data programmed to cause the receiving jukebox device to at least:
check at least minimum version information required for execution of said new file;
verify that existing files required for the execution of said new file correspond to said minimum version information requirements; and
update the receiving jukebox device using said new file in dependence on said verifying.

2. The server of claim 1, wherein said verifying includes verifying, starting at the lowest level of dependency associated with said new file, that any existing files required for the execution of said new file correspond to said minimum version information requirements, and wherein the receiving jukebox device is further caused to repeat said verifying until a highest level of dependency associated with said new file is reached.

3. The server of claim 1, wherein the receiving jukebox device is further caused to generate a file when a missing dependency is detected, said missing dependency being determined by the receiving jukebox device failing to verify that an existing file corresponds to said minimum version information requirements.

4. The server of claim 3, wherein the processing resources of the server are further configured to at least:
receive a copy of said generated file;
read said copy; and
send one or more new files, corresponding to said files from which said missing dependency was determined.

5. The server of claim 1, wherein the modules are interconnected by dynamic links.

6. The server of claim 5, wherein the libraries are dynamic link libraries organized among themselves according to a plurality of dependency levels.

7. The server of claim 1, wherein the receiving jukebox device is further caused to maintain a backup of a previous version of said new file.

8. The server of claim 7, wherein the receiving jukebox device is further caused to change an execution level of the files of the jukebox device once an update has been accomplished.

9. The server of claim 1, wherein the receiving jukebox device is further caused to change an execution level of the files of the jukebox device once an update has been accomplished.

10. The server of claim 1, wherein the jukebox device is configured to receive and cause at least some updates to operating files and/or parts of a program executable thereon without having to reinitialize the jukebox device.

11. A digital jukebox device provided with an operating system in which different tasks are broken down into a plurality of interconnected modules and further comprising libraries, the jukebox device being configured to receive system update files in connection with at least one processor and a memory that cooperate with one another to at least:
receive a new file from a remote loading source;
check at least minimum version information required for execution of said new file;
verify that existing files required for the execution of said new file correspond to said minimum version information requirements; and
update the jukebox device using said new file in dependence on said verifying.

12. The device of claim 11, wherein said verifying comprises verifying, starting at the lowest level of dependency associated with said new file, that any existing files required for the execution of said new file correspond to said minimum version information requirements, and
wherein said verifying is repeated until a highest level of dependency associated with said new file is reached.

13. The device of claim 11, wherein the at least one processor and the memory are further configured to at least generate a file when a missing dependency is detected, said missing dependency being determined by the receiving jukebox device failing to verify that an existing file corresponds to said minimum version information requirements.

14. The device of claim 13, wherein the at least one processor and the memory are further configured to at least:
transmit a copy of said generated file to said remote loading source; and
receive one or more new files, corresponding to said files from which said missing dependency was determined, from the remote loading source.

15. The device of claim 11, wherein the modules are interconnected by dynamic links.

16. The device of claim 15, wherein the libraries are dynamic link libraries organized among themselves according to a plurality of dependency levels.

17. The device of claim 11, wherein the at least one processor and the memory are further configured to at least maintain a backup of a previous version of said new file.

18. The device of claim 17, wherein the at least one processor and the memory are further configured to at least change an execution level of the files of the jukebox device once an update has been accomplished.

19. The device of claim 11, wherein the at least one processor and the memory are further configured to at least change an execution level of the files of the jukebox device once an update has been accomplished.

20. The device of claim 11, wherein the at least one processor and the memory are further configured to at least cause some updates to operating files and/or parts of a program executable on the jukebox device without having to reinitialize the jukebox device.

* * * * *